Oct. 11, 1960 J. C. RENAULT ET AL 2,955,693
SAFETY INTERLOCK FOR LAUNDRY EXTRACTORS
Filed May 26, 1958 3 Sheets-Sheet 1
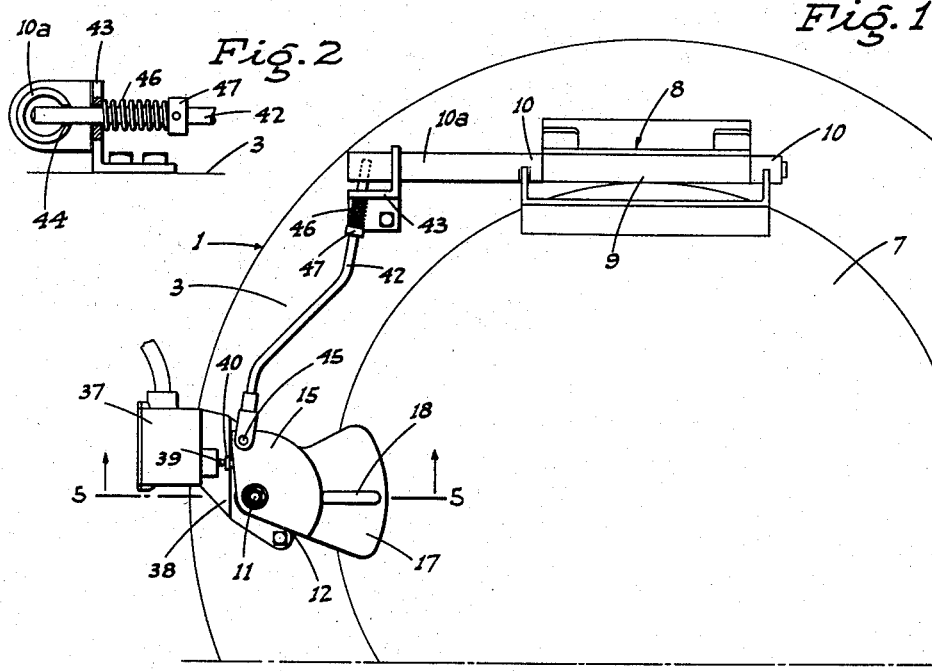
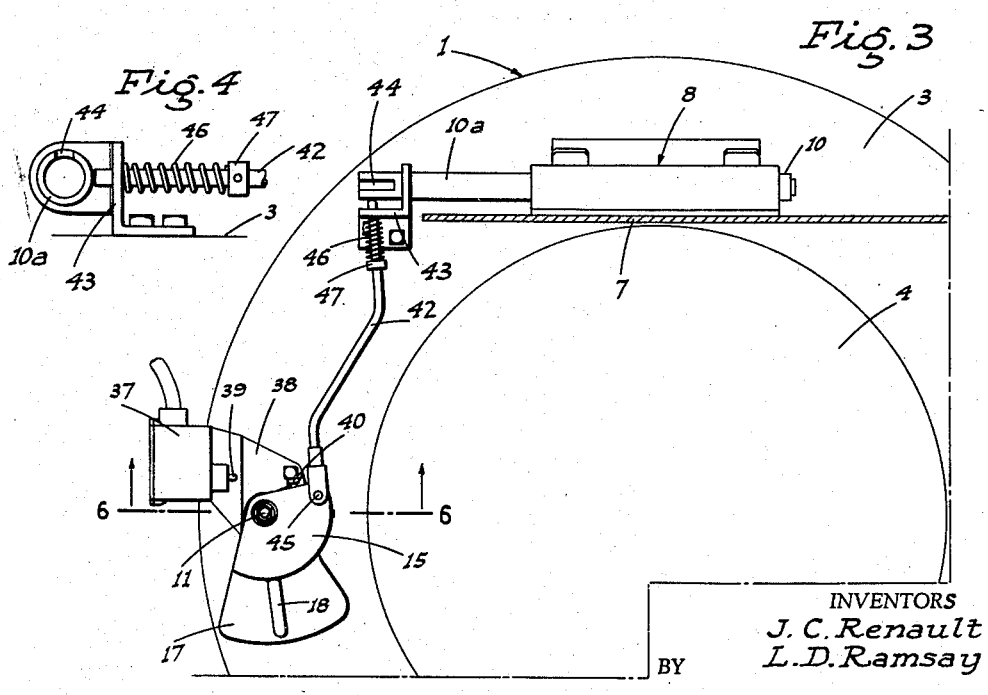
INVENTORS
J. C. Renault
L. D. Ramsay
ATTYS

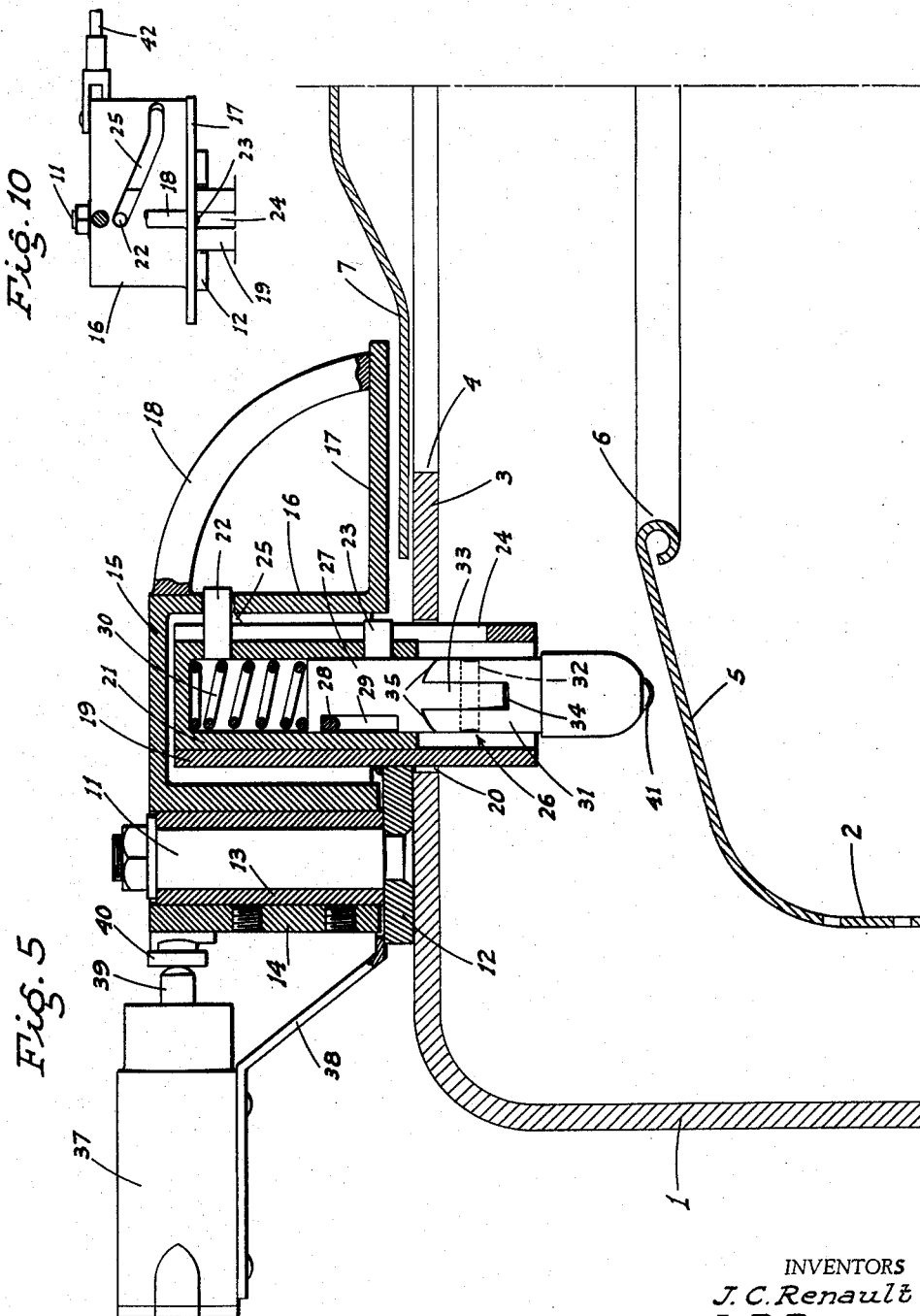

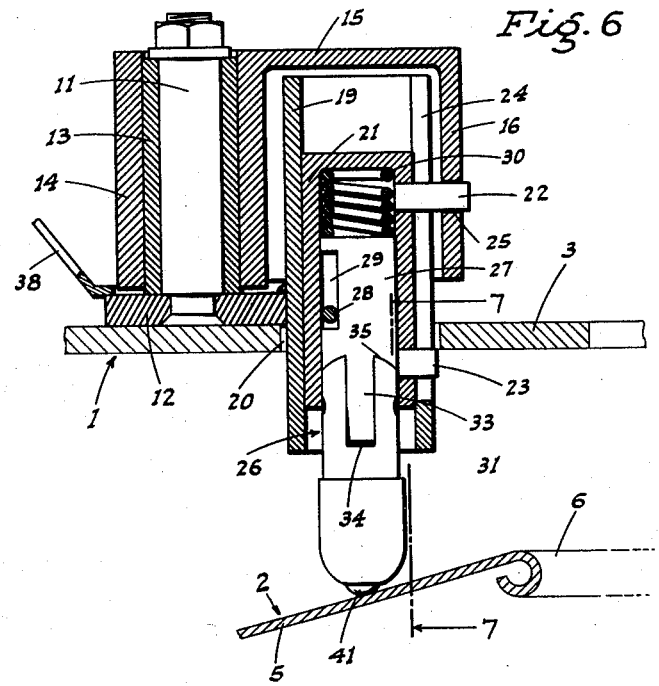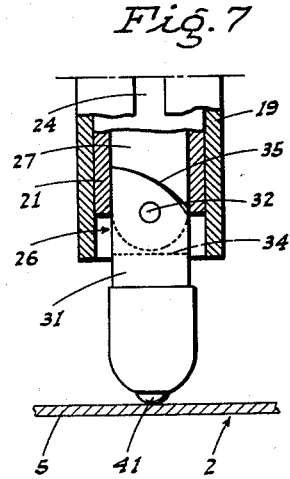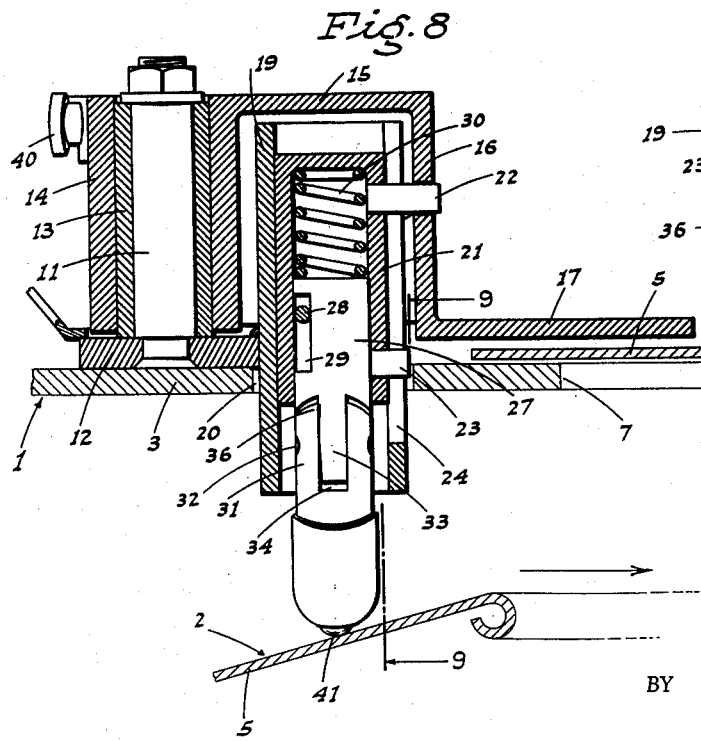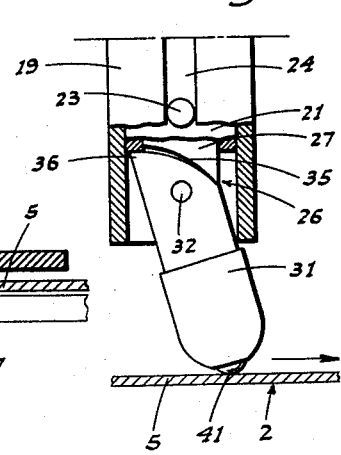
INVENTORS
J. C. Renault
L. D. Ramsay

United States Patent Office 2,955,693
Patented Oct. 11, 1960

2,955,693

SAFETY INTERLOCK FOR LAUNDRY EXTRACTORS

Jean C. Renault and Leonard D. Ramsay, Salinas, Calif., assignors to Gabilan Iron and Machine Company, Salinas, Calif., a corporation of California Filed May 26, 1958, Ser. No. 737,797

7 Claims. (Cl. 192—136)

This invention relates to a safety device for use with the cover of the housing of an enclosed rotary member; being particularly designed for the cover of the stationary bowl or shell of a laundry extractor which includes a motor driven basket within the bowl.

The major object of the invention is to provide a device for the purpose which will prevent the motor of the basket from being started while the cover is raised, or even when the cover is closed but is not locked; and which will prevent the cover from being unlocked and raised as long as the basket is rotating.

A further object of the invention is to provide a device for the purpose which is mainly in the form of an attachment which may be mounted on any conventional extractor without having to make any changes thereto.

Still another object of the invention is to provide a safety interlock for laundry extractors which is designed for ease and economy of manufacture.

These objects are accomplished by means of such structure and relative arrangement of parts as will fully appear by a perusal of the following specification and claims.

In the drawings:

Fig. 1 is a fragmentary top outline of a laundry extractor with the cover closed and with the improved safety interlock device attached and in operation; or as holding the cover locked and the motor switch closed.

Fig. 2 is a fragmentary enlarged end view of the cover-hinge lock in engaged position, or as shown in Fig. 1.

Fig. 3 is a view similar to Fig. 1, but showing the cover raised and the motor switch open.

Fig. 4 is a similar view of the hinge lock as released and with the cover raised, or as shown in Fig. 3.

Fig. 5 is an enlarged vertical section on line 5—5 of Fig. 1.

Fig. 6 is a similar fragmentary vertical section on line 6—6 of Fig. 3.

Fig. 7 is a fragmentary vertical section taken on a plane at right angles to Fig. 4, substantially on line 7—7 of Fig. 6.

Fig. 8 is a fragmentary vertical section substantially on line 5—5 of Fig. 1, but with the cover lock turned slightly toward an open or release position and when the basket is rotating.

Fig. 9 is a fragmentary vertical section taken in a plane at right angles to Fig. 8 substantially on line 9—9 of Fig. 8.

Fig. 10 is a fragmentary face view of the cover lock unit, detached and on a reduced scale from the showing of Fig. 5.

Referring now more particularly to the drawings, and to the characters of reference marked thereon, the machine to which the improved interlock device is applied is here shown as being a laundry extractor which includes a stationary bowl or housing 1 having a rotary basket 2 therein and arranged as usual to be driven by a motor (not shown).

The bowl includes a top wall or flange 3 surrounding an opening 4 which gives access to the basket. The basket also includes a top flange 5 surrounding the opening 6 therein, and which is concentric with opening 4 (see Fig. 5).

A cover 7 normally rests on the bowl flange 3 over the opening 4; said cover being connected at its edge to the bowl flange 3 by a hinge, as at 8, for raising and lowering movement about a horizontal axis. The hinge comprises a hinge sleeve 9 secured to the bowl flange and end sleeves 10 secured to the cover and turnable on the hinge pin; one of such sleeves 10 being formed, for our purpose, with an elongated extension 10a, as shown in Figs. 1 and 3.

The cover interlock device, which is mounted in connection with the above described machine parts, is constructed as follows:

A post 11 is fixed on a base plate 12 which is secured on the bowl flange 3 at a point such that the post is substantially 90 degrees from the axis of the cover hinge and on the same side thereof as the hinge sleeve extension 10a, as shown in Figs. 1 and 3, and some distance radially out from the adjacent edge of opening 4, as clearly shown in Fig. 5.

A bushing 13 is turnable on the post, but is held against axial movement thereon, and clamped thereon for vertical adjustment relative thereto is a hub 14. This hub is rigid with a top wall 15 from the outer edge of which a skirt 16 depends; said skirt or wall being concentric with the hub and post, and being disposed in a plane close to but radially out from the adjacent edge of the cover.

A horizontal latching flange or lip 17 projects from the lower edge of the skirt in close and normally overlying relation to the adjacent portion of the cover 7, as shown in Fig. 1. A handle 18—to enable the above described turnable cover latching unit, consisting of hub 14, top wall 15, skirt 16, and flange 17, to be readily turned by hand—connects the skirt adjacent the top thereof and the flange adjacent its outer edge substantially midway of its arcuate extent.

A tubular guide member 19 is disposed in the space between the hub 14 and the skirt 16 and is rigid with the base plate 12; being positioned substantially in line with the post 11 radially of the bowl 1 and projecting into the bowl above the basket flange 5 through an opening 20 in the bowl flange 3.

A capped sleeve 21 is slidable in the member 19, and is held against rotation therein by upper and lower radial pins 22 and 23 working in a vertical slot 24 in member 19. The top pin 22 also projects through a cam slot 25 in skirt 16 arranged so that upon rotation of said skirt through a predetermined arc from an initial position in which the lip 17 is in a full cover engaging position, and in a direction away from the cover hinge, the sleeve 21 will be lowered a predetermined distance. The sleeve 21 is considerably shorter than member 19, so that when the upper end of said sleeve and member are substantially alined, as shown in Fig. 5, there is a considerable distance between the lower end of the sleeve and that of the guide member.

A two-part plunger, indicated generally at 26, is slidable in the sleeve 21 and depends therefrom and from the guide member 19 to a point normally clear of but relatively close to the basket flange 5. The upper portion 27 of the plunger is prevented from rotation in the sleeve 21 by a cross pin 28 in said sleeve working in a limiting notch 29 in the wall of the plunger portion.

A compression spring 30 in the sleeve above the plunger yieldably bears down on the latter and normally hold the cross pin against the top of the notch 29, as shown in Fig. 5.

The lower portion 31 of the plunger is below but adjacent the lower end of the sleeve when the plunger is in the above described position in said sleeve, and is pivoted to the upper portion of the plunger by a pin 32 extending radially of the bowl 1. To provide the pivoted connection, the upper portion 27 is formed with a central depending tongue 33 which projects into a slot 34 in the lower portion 31; the pin 32 extending through said tongue.

The diameters of the upper and lower portions of the plunger are the same at the zone of the pivot connection, and the cooperating circumferential surfaces on said portions at thet upper end of the tongue are cut on the bias or at an angle to the axis of the plunger and in a transverse plane parallel to the pin 32, as indicated at 35. These cooperating surfaces are arranged so that they prevent turning or swivel movement of the lower plunger portion about the pin 32 in one direction from an axially alined position of said portion with the upper plunger portion, as shown in Fig. 7. The lower plunger portion 31 can however turn in the opposite direction, so that the upper end of said portion at the sides of slot 34 project from the adjacent side wall of the upper plunger portion 27 in the form of stop lugs 36, as shown in Fig. 9.

A switch 37, which is interposed in the circuit of the motor which actuates the basket 2, is mounted on a bracket 38 supported from the base plate 12 in a position opposite the cover holding or locking flange 17, with respect to the post 11, as shown in Figs. 1 and 3. The switch includes an actuating button 39 projecting horizontally toward and substantially on a level with the top plate 15 of the cover locking unit in a position between the post 11 and the cover hinge 8, and adapted to be engaged and pushed inward—to a switch closing position—by a nub 40 projecting from the adjacent edge of the top plate 15. This engagement and closing of the switch takes place only when the latching lip 17 is in a full cover overlapping position, and when the pin 22 of the sleeve 21 is at the upper end of the cam slot 25.

From the above description of parts it will be seen that when it is desired to open or raise the cover 7, the latch flange 17 must be swung about post 11 as an axis from the position shown in Figs. 1 and 5 sufficiently to clear the cover and in a direction away from the cover hinge. With the initial portion of such swinging movement, the plunger 26 and sleeve 21 are lowered as a unit, due to the downward movement imparted to the sleeve-mounted pin 22 by the cam slot 25, until the anti-friction element 41 on the lower end of the plunger engages and rides on the basket flange. If the basket is not rotating, the plunger will remain in its normal straight alinement from end to end and the sleeve 21 may then be lowered over the lower portion of the plunger. Since such lowering is effected by continued swinging of the latch flange unit and the further movement of the pin 22 down the cam slot 25 against the resistance of the spring 30, the latch flange 17 may thus clear the cover, as shown in Fig. 3. In other words, the latch plate may be swung to a cover clearing position as long as the basket is stationary. At the same time, of course, the nub 40 moves away from the switch button 39, and the switch opens; preventing the basket motor from being started unless the cover is closed and latched.

If, however, the basket is rotating when the plunger element 41 engages and bears down on the cover flange, the lower portion 31 of the plunger is swung about the pivot pin 32 as an axis, or deflected from axial alinement with the upper portion of the plunger. This causes the stop lugs 36 to project from the side of the upper portion of the plunger, as shown in Fig. 9, and the sleeve 21 cannot be lowered beyond such lugs, as will be evident. Since such lowering can only be effected by a turning of the latch flange unit, it will be obvious that if the sleeve cannot be lowered the flange unit cannot turn, and the flange cannot therefore be moved clear of the cover and thet latter cannot be raised. If the basket stops and the turning pressure on the flange unit is reversed or released, the spring 30 acts to lift the sleeve 21 clear of the lower plunger portion, and the latter can then resume its normal straight position.

In order to prevent the latch unit from being swung to its cover latching position, and thus closing the motor switch even though the cover may not be closed, the following cooperating arrangement between the cover and said latch unit is provided, as shown in Figs. 1–4.

Pivoted at one end on the top wall 15 of the latching flange unit at the end thereof nearest the hinge extension 10a is a rod 42. This rod projects toward said hinge extension and freely slides adjacent its other end through a bracket 43 upstanding from and secured on the bowl flange 3, adjacent the outer end of said hinge extension.

The bracket also provides a bearing for the hinge extension. The rod 42 at the bracket is in radial alinement with the extension 10, as shown in Figs. 2 and 4, and said extension is formed with a radial recess 44 therein of a size and in a position to receive the adjacent end of the rod 42 therein when the cover 7, which turns with the extension 10a, is closed.

The rod is of a length such that it will enter the recess, and thus prevent rotation of the hinge extension and raising of the cover, when the cover latch flange 17 is in a full cover lapping position and the switch 37 is closed. The pivot 45 of the rod 42 is then beyond a dead-center position with respect to a line projected through the post 11 and the point of engagement of the rod with the bracket.

A compression spring 46 on the rod 42 between the bracket 43 and a stop collar 47 on the rod acts, through the rod, to hold the latch flange unit turned so that the nub 40 firmly engages the switch button when said rod is engaged in the recess 44.

When the rod is pulled out of the recess by swinging of the latch flange 17 to a cover-clearing position, upward opening or raising movement of the cover of course shifts the position of the recess and moves the same out of alignment with the end of the rod, as shown in Fig. 3. Thereafter, the latch flange unit cannot be swung back to a switch closing or cover lapping position, since the rod 42 is stopped from advance by the solid wall of the hinge extension. Said latch unit cannot therefore be moved to the above named position unless the cover is first closed.

While the device herein described has been primarily designed for use in connection with a laundry extractor, it may also be embodied in any comparable machine or apparatus which includes a rotary member enclosed in a housing having an opening giving access to said member and a door or cover for said opening which should be held against being opened while the rotary member is turning.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a laundry extractor which includes a rotary vertical-axis basket, a housing enclosing the basket and having a top wall defining an opening giving access to the basket, a cover for the opening, and a horizontal transverse hinge connecting the cover at its edge to the top wall; a safety latch device for the cover comprising a post mounted on and upstanding from the top wall to one side of the cover and in circumferentially spaced relation to the hinge, a latch unit turnable on the post and including a horizontal latch flange arranged when in one position to clear the cover and to overlap the same at one edge when the unit is turned to a second position, a tubular vertical guide fixed in the top wall and projecting into the housing in a position between the post and latch flange, a sleeve slidable in the guide, an operative connection between the sleeve and unit to lower the sleeve a predetermined distance upon turning the unit from the one position to the second position, an element mounted in the sleeve and arranged to contact the basket on top thereof upon downward movement of the sleeve a relatively short distance, and means between the element and sleeve preventing downward movement of the sleeve more than said short distance if the basket is rotating when said element contacts the same.

2. A device, as in claim 1, in which said operative connection comprises a vertical wall on the unit concentric with the post and adjacent the guide, the latter having a vertical slot facing said vertical wall, and a pin mounted in the sleeve and projecting through thet slot; the vertical wall having a cam slot into which the pin projects, said cam slot having a downward slope in a direction opposite that toward which the unit turns to reach said second position.

3. In a laundry extractor which includes a rotary vertical-axis basket, a housing enclosing the basket and having a top wall defining an opening giving access to the basket a cover for the opening, and a horizontal transverse hinge connecting the cover at its edge to the top wall; a safety latch device for the cover comprising a post mounted on and upstanding from the top wall to one side of the cover and in circumferentially spaced relation to the hinge, a latch unit turnable on the post and including a horizontal latch flange arranged to overlap the cover at one edge when the unit is turned to a second position, a tubular vertical guide fixed in the top wall and projecting into the housing in a position between the post and latch flange, a sleeve slidable in the guide, an operative connection between the sleeve and unit to lower the sleeve a predetermined distance upon turning the unit from the one position to the second position, an element mounted in the sleeve and arranged to contact the basket on top thereof upon downward movement of the sleeve a relatively short distance, a plunger slidable and non-turnable in the sleeve and projecting below the same and arranged to contact the basket on top thereof upon downward movement of the sleeve a relatively short distance, a spring between the sleeve and plunger yieldably resisting downward movement of the sleeve on the plunger, and means formed with the plunger preventing downward movement of the sleeve more than said short distance if the basket is rotating when the plunger contacts the same.

4. In a laundry extractor which includes a rotary vertical-axis basket, a housing enclosing the basket and having a top wall defining an opening giving access to the basket, a cover for the opening, and a horizontal transverse hinge connecting the cover at its edge to the top wall; a safety latch device for the cover comprising a post mounted on and upstanding from the top wall to one side of the cover and in circumferentially spaced relation to the hinge, a latch unit turnable on the post and including a horizontal latch flange arranged to overlap the cover at one edge when the unit is turned to a second position, a tubular vertical guide fixed in the top wall and projecting into the housing in a position between the post and latch flange, a sleeve slidable in the guide, and operative connection between the sleeve and unit to lower the sleeve a predetermined distance upon turning the unit from the one position to the second position, an element mounted in the sleeve and arranged to contact the basket on top thereof upon downward movement of the sleeve a relatively short distance, a plunger slidable and non-turnable in the sleeve and projecting below the same and arranged to contact the basket on top thereof upon downward movement of the sleeve a relatively short distance, a spring between the sleeve and plunger yieldably resisting downward movement of the sleeve on the plunger, the plunger being a two-part member comprising upper and lower portions of the same diameter at adjacent ends, and a transverse pivot connecting said parts and disposed radially of the basket; the parts having cooperating edges at their adjacent ends cut at an angle in a plane parallel to the pivot and sloping down in the direction of rotation of the basket, said edges and the pivot being below the initial position of the sleeve on the plunger whereby when the plunger contacts the basket and the latter is rotating, the lower portion of the plunger will be swung about the pivot and the high point of the angled edge on said lower portion will project from the plane of the adjacent side of the upper portion whereby to form a stop in the path of lowering movement of the sleeve.

5. In a laundry extractor which includes a rotary motor-driven vertical-axis basket, a housing enclosing the basket and having a top wall defining an opening giving access to the basket, a cover for the opening, and a horizontal transverse hinge connecting the cover at its edge to the top wall; a safety latch device for the cover comprising a post mounted on and upstanding from the top wall to one side of the cover and in spaced relation to the hinge circumferentially of the housing, a latch unit turnable on the post and including a horizontal latch element arranged when in one position to clear the cover and to engage the cover at one edge when the unit is turned to a second position, a normally open switch in the circuit of the basket-rotating motor positioned adjacent the latch unit, means fixed with said unit to close the switch only upon said latch element being in a cover engaging position, and means between the turnable unit and the cover hinge to prevent the latch element, after having been once moved clear of the cover to said one position and the latter has been swung up about its hinge, from being returned to a cover engaging position unless the cover is again closed.

6. A device, as in claim 5, in which said means comprises a hinge extension rigid with the cover and projecting from the hinge on the same side of the housing as said latch unit, a rod pivoted at one end on the unit and projecting thence toward the hinge extension, a bracket on the top wall adjacent the extension and through which the rod slides adjacent its other end, said other end extending radially of the hinge extension and the latter having a radial recess to register with and receive said end of the rod when the flange on the latch unit is in the one position; the pivot of the rod on the unit being so positioned relative to the pivot of the unit as to cause the rod to be withdrawn from the recess upon turning of the unit from said one position to the second position.

7. A device as in claim 6 with a compression spring on the rod bearing at one end against the bracket and at the other end against a stop collar on the rod; the rod pivot being positioned on the unit relative to the post so as to be beyond dead-center with respect to a line drawn from the bracket to the post when the unit is in said one position.

(References on following page)

References Cited in the file of this patent

UNITED STATES PATENTS

| | | |
|---|---|---|
| 1,582,789 | Schmauk | Apr. 27, 1926 |
| 1,582,790 | Schaum | Apr. 27, 1926 |
| 1,582,791 | Bodenschatz | Apr. 27, 1926 |
| 1,797,602 | Bryson | Mar. 24, 1931 |
| 1,933,240 | Bruger | Oct. 31, 1933 |
| 1,971,466 | Schaum | Aug. 28, 1934 |
| 1,991,874 | Williams | Feb. 19, 1935 |
| 2,824,649 | Smith | Feb. 25, 1958 |

FOREIGN PATENTS

| | | |
|---|---|---|
| 260,255 | Germany | May 23, 1913 |
| 28,984 | Great Britain | of 1909 |
| 390,578 | Great Britain | Apr. 13, 1933 |
| 442,309 | Great Britain | Feb. 6, 1936 |
| 871,679 | France | Jan. 19, 1942 |